S. H. SMITH.

CELL PACKAGE FOR FRUIT, &c.

No. 10,876. Reissued Oct. 18, 1887.

Witnesses

Wm. Rheem

E. G. Siggers

Inventor

Seth Henry Smith

By his Attorneys.

C. A. Snow & Co.

UNITED STATES PATENT OFFICE.

SETH HENRY SMITH, OF DELTA, OHIO.

CELL-PACKAGE FOR FRUIT, &c.

SPECIFICATION forming part of Reissued Letters Patent No. 10,876, dated October 18, 1887.

Original No. 317,033, dated May 5, 1885. Application for reissue filed April 11, 1887. Serial No. 231,454.

*To all whom it may concern:*

Be it known that I, SETH HENRY SMITH, a citizen of the United States, residing at Delta, in the county of Fulton and State of Ohio, have invented a new and useful Improvement in Cell-Packages for Eggs, Fruit, &c., of which the following is a specification, reference being had to the accompanying drawings.

My invention relates to an improvement in cell-packages for eggs, fruit, &c.; and it consists in the peculiar arrangement of parts, that will be more fully set forth hereinafter.

Figure 1:
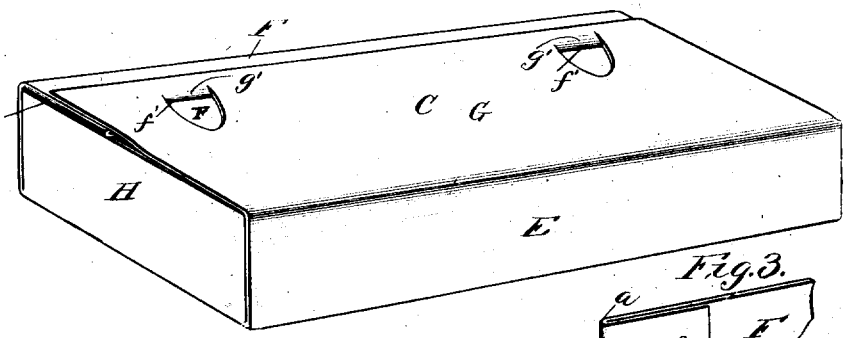
Figure 3:
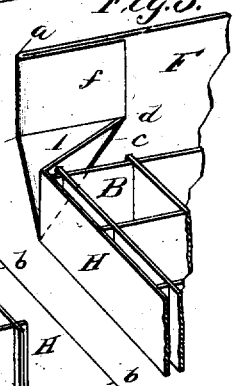
Figure 2:
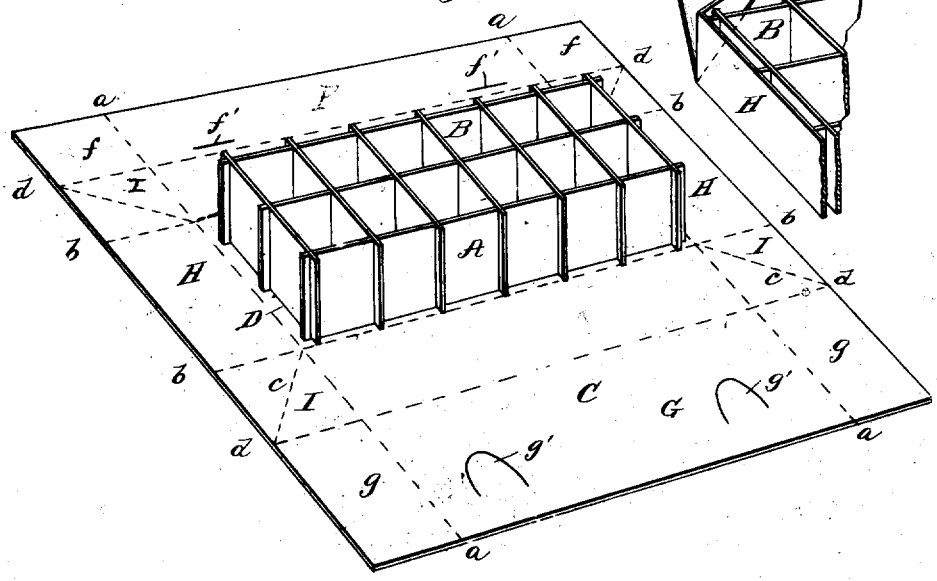

In the accompanying drawings, Figure 1 is a perspective view of one of my packages, showing the wrapper folded over the package. Fig. 2 is a similar view showing the wrapper open. Fig. 3 is a detailed perspective view of one corner of the case, showing the wrapper while being folded over the case to form the package.

A represents a case, which is made of pasteboard or other suitable material, and is composed of a number of cells, B. These cells may be either square, as here shown, or round, or of any other shape desired.

C represents a wrapper upon which the case is placed. The case may be glued or otherwise permanently secured to the wrapper, or it may be loosely placed thereon, as preferred. Eggs, fruit, or other articles are placed in the case, and the wrapper is then folded over the case, as shown in Fig. 1.

In Fig. 2 I have shown in dotted lines the folds that are made in the wrapper in inclosing the case. These folds form the wrapper into the bottom D, sides E, flaps G F, ends H, flap end re-enforce portions, *f g*, and the corner re-enforce portions, I. In the flap F are cut slots *f'*, and the flap G is provided with tongues *g'*, that enter the slots *f'*, and thereby secure the flaps together when the wrapper is folded.

In order to form the package, the projecting portions of the wrapper at the ends of the case are turned up vertically on the lines *a a* to form the ends H. The wrapper is turned up at the sides of the case on the lines *b b* to form the sides E. The corner portions, I, which result are folded in diagonally on the lines *c* and serve to re-enforce the corners of the package. The flaps F G are bent on the lines *d d*. The corner portions, *f g*, which result from the intersection of the lines *a a* and *b b*, are folded under the flaps and form end re-enforce portions therefor, and then the flaps are folded over the case and secured together, and the package is completed.

When in use, eggs or fruit are placed in the cells and the packages shipped in boxes of any desired size.

These packages are very convenient for retailing the eggs or fruit, and present a very attractive appearance.

These packages may be made of any desired size, so as to contain six, a dozen, or any desired number of cells.

Having thus described my invention, I claim—

1. A package consisting of the case A and the wrapper which incloses the case, said wrapper being folded over the case on the lines *a a*, *b b*, *c*, and *d d*, so as to form the bottom D, ends H, sides E, corner re-enforce portions, I, flaps F G, and flap end re-enforce portions, *f g*, substantially as described.

2. The herein-described blank folded on the lines *a a*, *b b*, *c*, *d d*, to form the bottom, ends, sides, corner re-enforce portions, I, flaps F G, and flap end re-enforce portions, *f g*, of the wrapper, as set forth.

In testimony that I claim the foregoing as my own I have hereto affixed my signature in presence of two witnesses.

SETH HENRY SMITH.

Witnesses:
SAMUEL HENRICKS,
J. M. LONGNECKER.